United States Patent [19]
Giebel et al.

[11] Patent Number: 5,416,874
[45] Date of Patent: May 16, 1995

[54] OPTICAL RECEIVER STUB FITTING

[75] Inventors: Markus A. Giebel, Conover; Terry L. Cooke, Hickory, both of N.C.

[73] Assignee: Siecor Corporation, Hickory, N.C.

[21] Appl. No.: 272,975

[22] Filed: Jul. 1, 1994

[51] Int. Cl.$^6$ .................................................. G02B 6/44
[52] U.S. Cl. ............................... 385/100; 385/103; 385/106; 385/113; 385/114; 428/392; 174/23 R
[58] Field of Search ......................... 385/100–117, 385/87, 62, 81; 428/392, 34.9; 174/23 R

[56] References Cited
U.S. PATENT DOCUMENTS

| | | | |
|---|---|---|---|
| 5,217,808 | 6/1993 | Cobb | 385/100 |
| 5,249,248 | 9/1993 | Arroyo et al. | 385/109 |
| 5,373,100 | 12/1994 | Arroyo et al. | 174/23 R |

OTHER PUBLICATIONS

Siecor Recommended Procedure SRP-009-003 (Apr. 1993).
"Siecor Front-fed Cable Stud Installation" pp. 1-4.
Production Products Company Pub. No. 05-01-92.
"Fiber Optic Transport Connector".

*Primary Examiner*—Frank Gonzalez
*Assistant Examiner*—Phan T. H. Palmer
*Attorney, Agent, or Firm*—J. David Abernethy

[57] ABSTRACT

A cable assembly for attachment to an entry port of an optical enclosure. The assembly includes a plug for an end of an optical cable in a sealed housing having a single rigid tube and a single sealed nut. Connectorized optical fibers or an optical ribbon extend from the plug into the equipment enclosure.

14 Claims, 8 Drawing Sheets

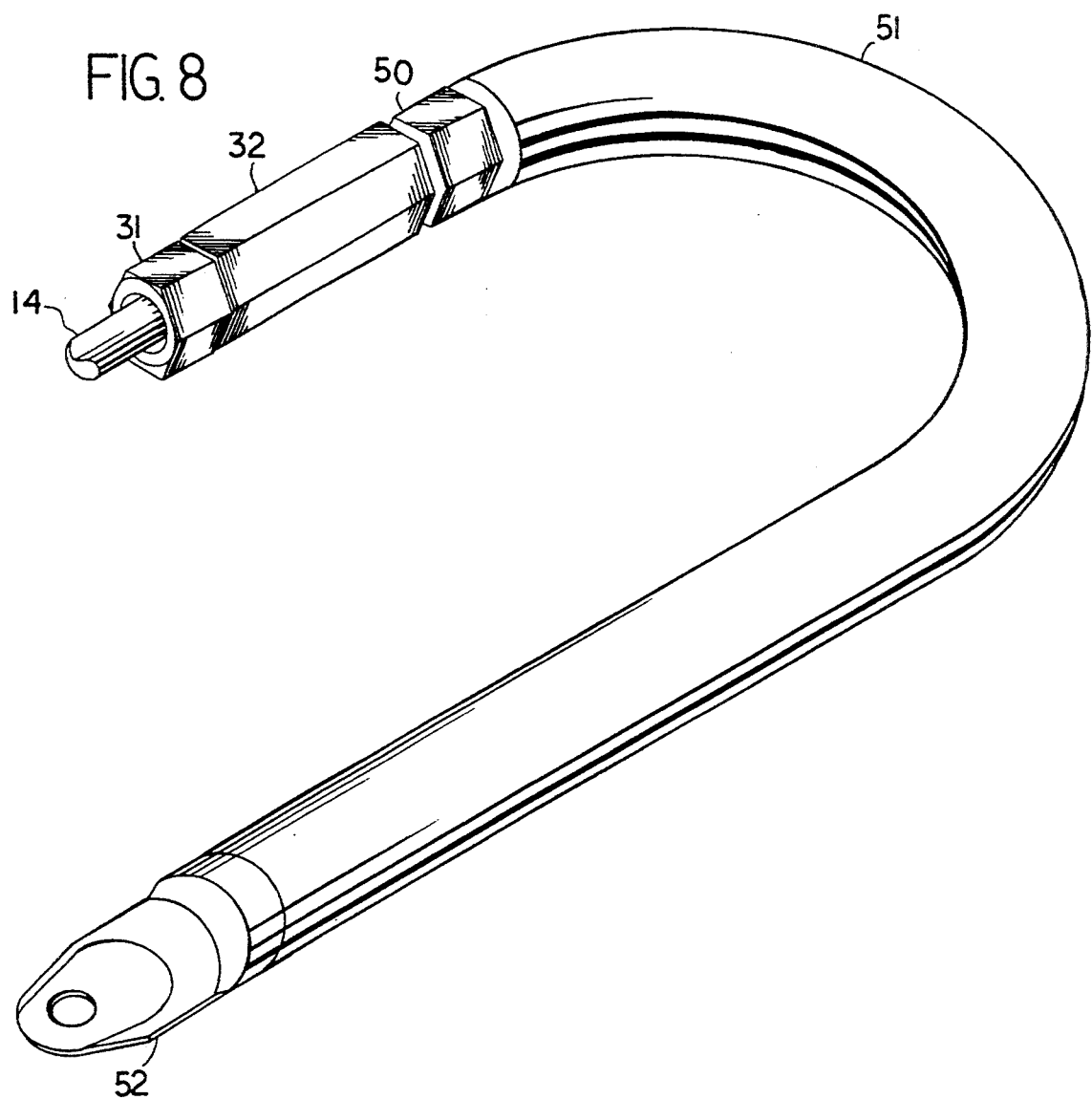

OPTICAL RECEIVER STUB FITTING

BACKGROUND OF THE INVENTION

Fiber optic cable assemblies for connection to optical enclosures are currently available. Such assemblies must securely anchor the cable and be environmentally sealed. Certain connectors anchor the cable by means of a clamping mechanism requiring two nuts in addition to a rear sealing nut. Although these connectors provide some anchoring and environmental sealing, the anchoring strength of the connector is limited due to the limited tolerance of many cables to clamping. A further disadvantage of such connectors is the additional opening between the two clamping nuts which must be sealed.

Objects of the invention are to provide a simple means for anchoring cable strength elements and to eliminate a possible moisture entry point.

SUMMARY OF THE INVENTION

The invention provides an improved cable assembly joining optical cables having optical fibers or optical fiber ribbons to optical enclosures such as patch panels or opto-electronic enclosures for optical networks. The cable holds the proximal span of a plurality of optical fibers or an optical ribbon including optical fibers. Connectorized or unconnectorized distal ends of the optical fibers or optical ribbon are contained within an optical enclosure having an internally threaded optical entry port. Mediate spans of the optical fibers or the optical ribbon are each surrounded by a flexible tube. A water-impervious plug encases a portion of the mediate span of each of the optical fibers or optical ribbon and the flexible tube or tubes, the plug also preferably encasing a portion of at least one cable strength member. The plug extends over a portion of the cable sheath. A metallic rigid jacket preferably encases the plug. Over the plug is an environmentally sealed housing for attaching the cable to the enclosure. As the housing does not depend on cable clamping, it requires only two members, namely a single rigid tube having two ends, a first end having an externally threaded extension connected to the entry port such that the rigid tube is outside the enclosure, and a second internally threaded end to which is attached a sealing nut having an externally threaded extension. A grommet is preferably present over the cable jacket between the sealing nut and the plug, and O-rings are placed in slots behind the external threads of the rigid tube and the sealing nut. The assembly may be grounded if desired.

BRIEF DESCRIPTION OF THE DRAWINGS

FIG. 8 is a perspective view of the cable pulls.

DETAILED DESCRIPTION OF THE PREFERRED EMBODIMENT

Figure 1:
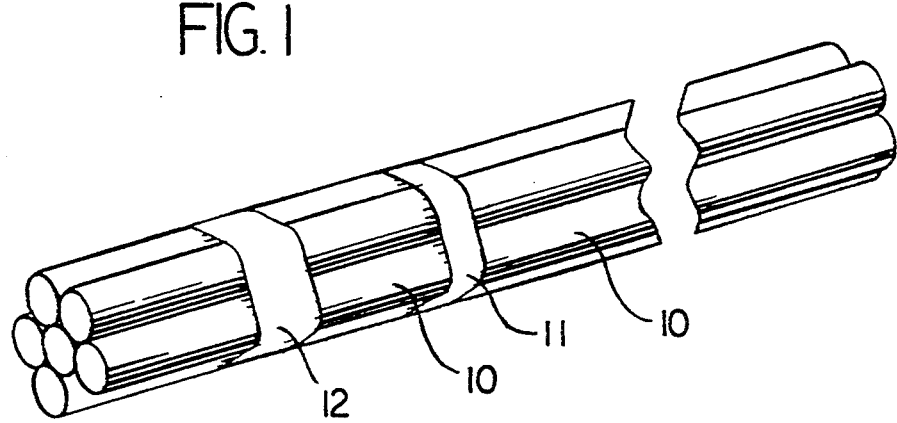
FIGS. 1 and 2 are perspective views of portions of a plurality of bundled flexible tubes.
Figure 2:
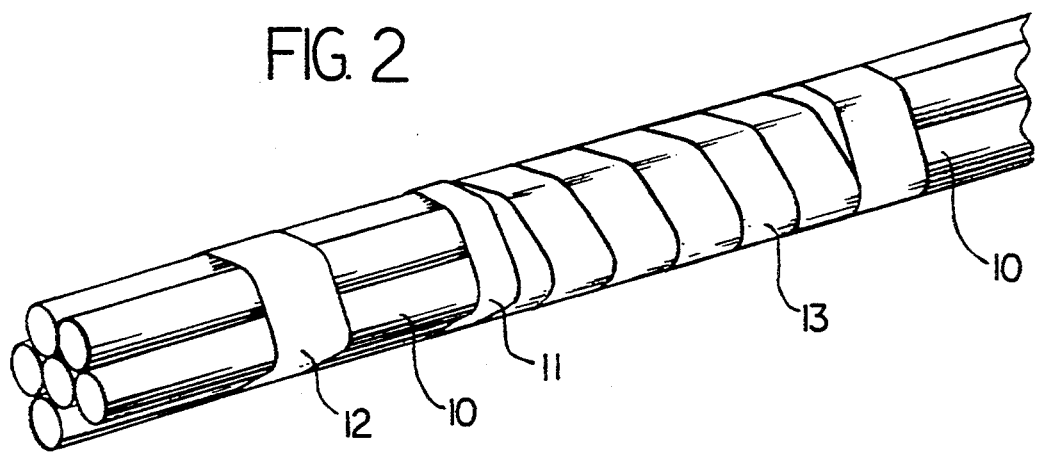

Nut 31 and grommet 30 are first placed over cable sheath 14. An array of flexible tubes 10 are bundled as shown in FIG. 1 by two strips 11,12 of heat shrinkable material which are preferably ¼ inch wide. Tubes 10 are preferably made of a lightweight, low friction, highly flexible plastic such as Teflon® plastic. Strips 11, 12 are placed 3/16th of an inch apart. Strip 12 is located around ¼ inch from one end of tubes 10.

After strips 11, 12 have cooled, spiral wrap material 13 is placed over the bundle of tubes 10, with one edge over strip 11 and the remainder proceeding in the direction opposite strip 12.

Figure 3:
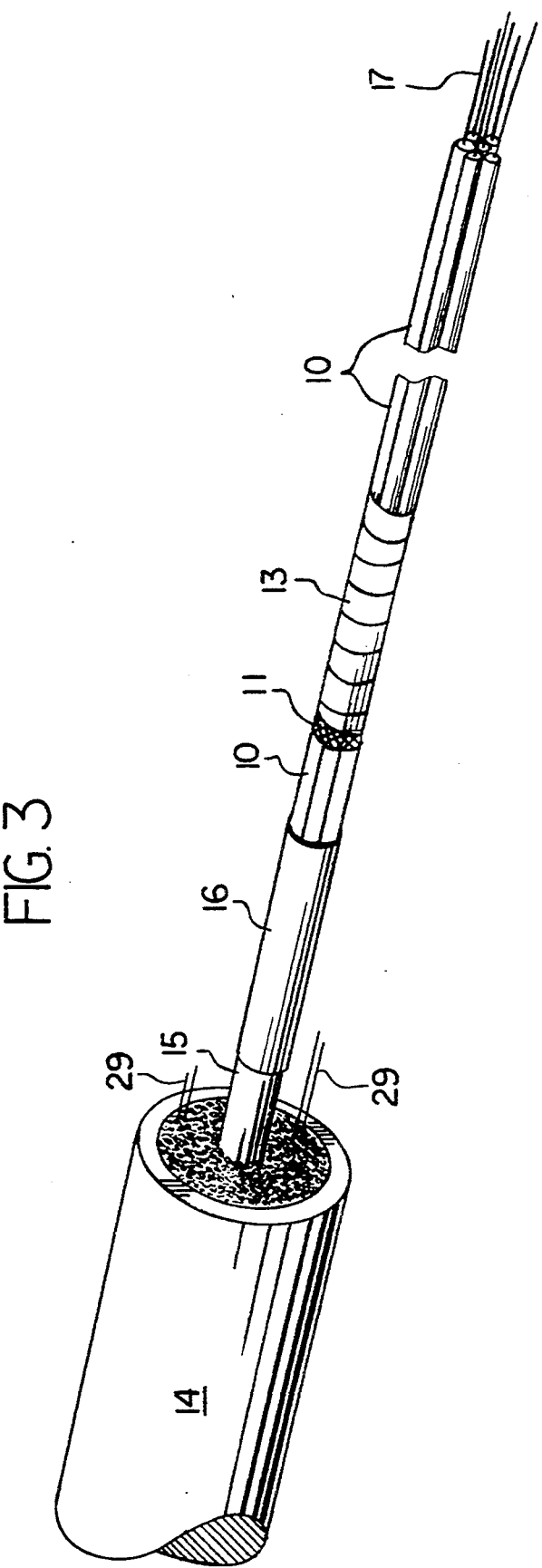
FIG. 3 is a perspective view of the assembly prior to formation of the sealed plug.
Figure 4:
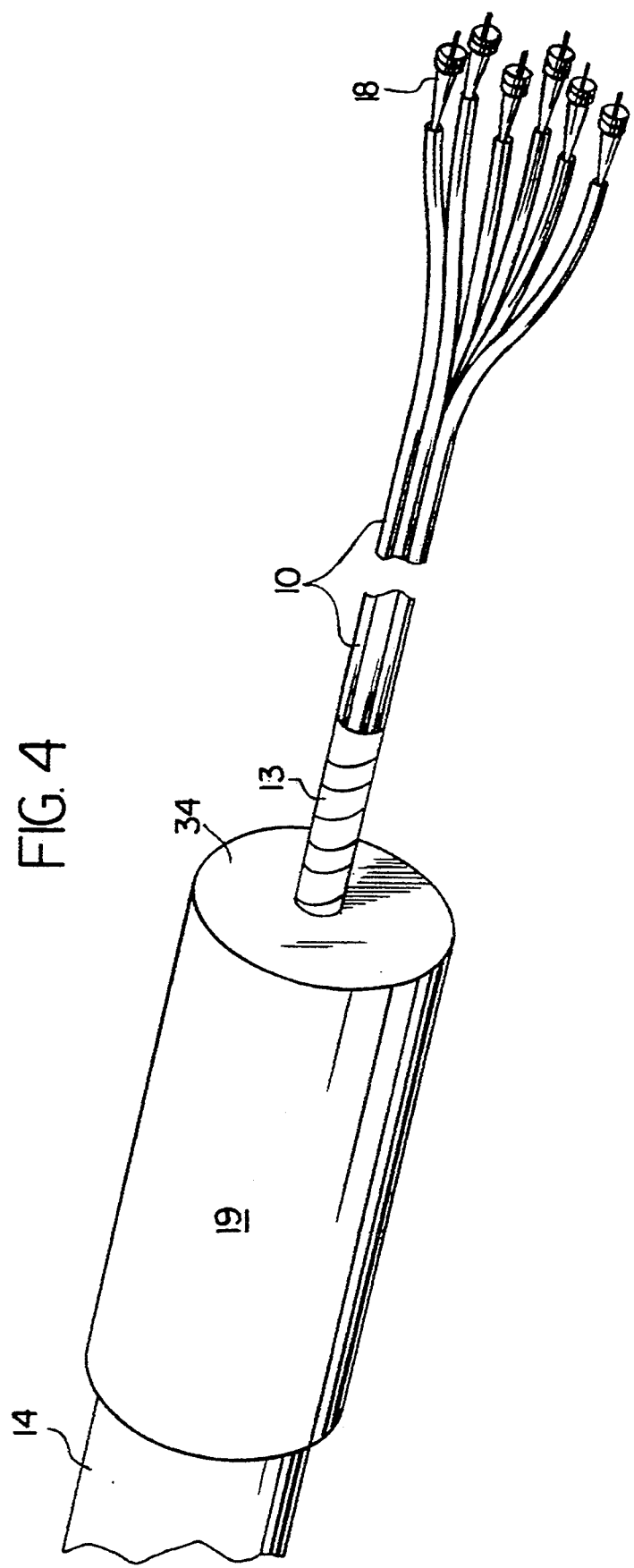
FIG. 4 is a perspective view of the assembly including the plug and the optical connectors.

An optical cable is then prepared as shown in FIG. 3. After one end of cable sheath 14 has been stripped back, a buffer tube including optical fibers 17 extends a short distance. A cable strength member such as aramid yarn 29 also extend a short distance. Each optical fiber 17 is threaded through a flexible tube 10, with an optical connector 18 being placed on the distal end of each optical fiber 17. As shown in FIG. 4, tubes 10 extend to meet the rear of connectors 18. A protective boot on each connector 18 may cover the end of a tube 10. After one end of tubes 10 have been placed inside a tube 15, an adhesive lined piece of heat shrinkable material 16 is placed over the junction of buffer tube 15 and flexible tubes 10. Heat is then applied to produce the configuration of FIG. 3.

The assembly of FIG. 3 is then placed in a rigid aluminum tubular jacket 19 held in a vertical fixture such that the end of cable sheath 14 and strength members 29 lie at the lower end of jacket 19 and spiral wrap material 13 and tubes 10 extend from the upper end of jacket 19. After grommet 30 is placed at the lower end of jacket 19, an epoxy is injected into the jacket to produce a cylindrical water impervious plug 34. If grounding is desired, jacket 19 should not be filled to the top in order to ensure electrical continuity between jacket 19 and rigid tube 32, made of an electrically conductive material such as aluminum. A conductor wire or spring would also be connected between metallic cable armor and jacket 19, made of a conductive metal such as aluminum. The wire may also be connected directly to enclosure 24. The assembly then has the appearance shown in FIG. 4.

Figure 5A:
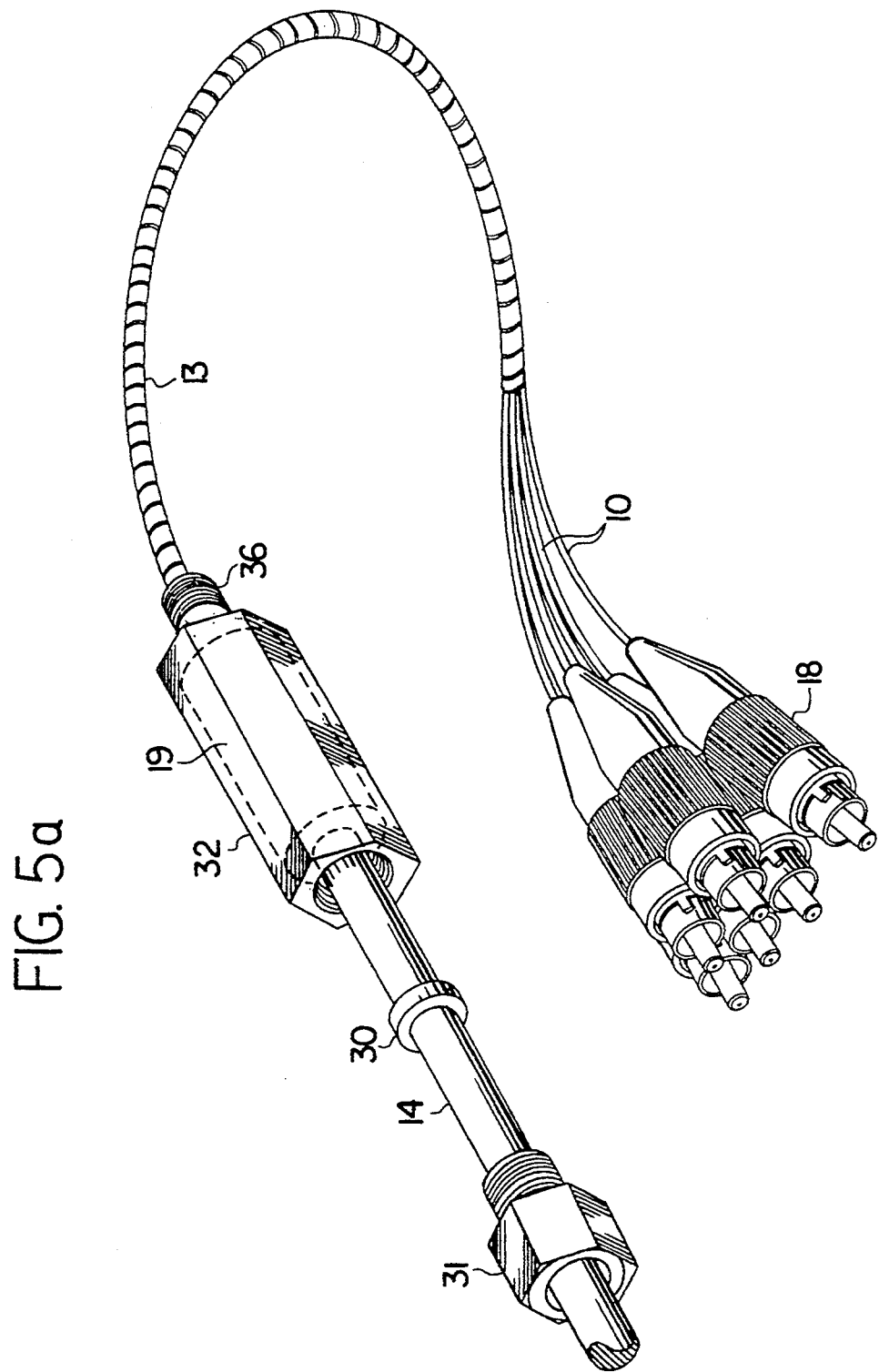
FIG. 5a is a perspective view of the assembly including the housing.
Figure 5B:
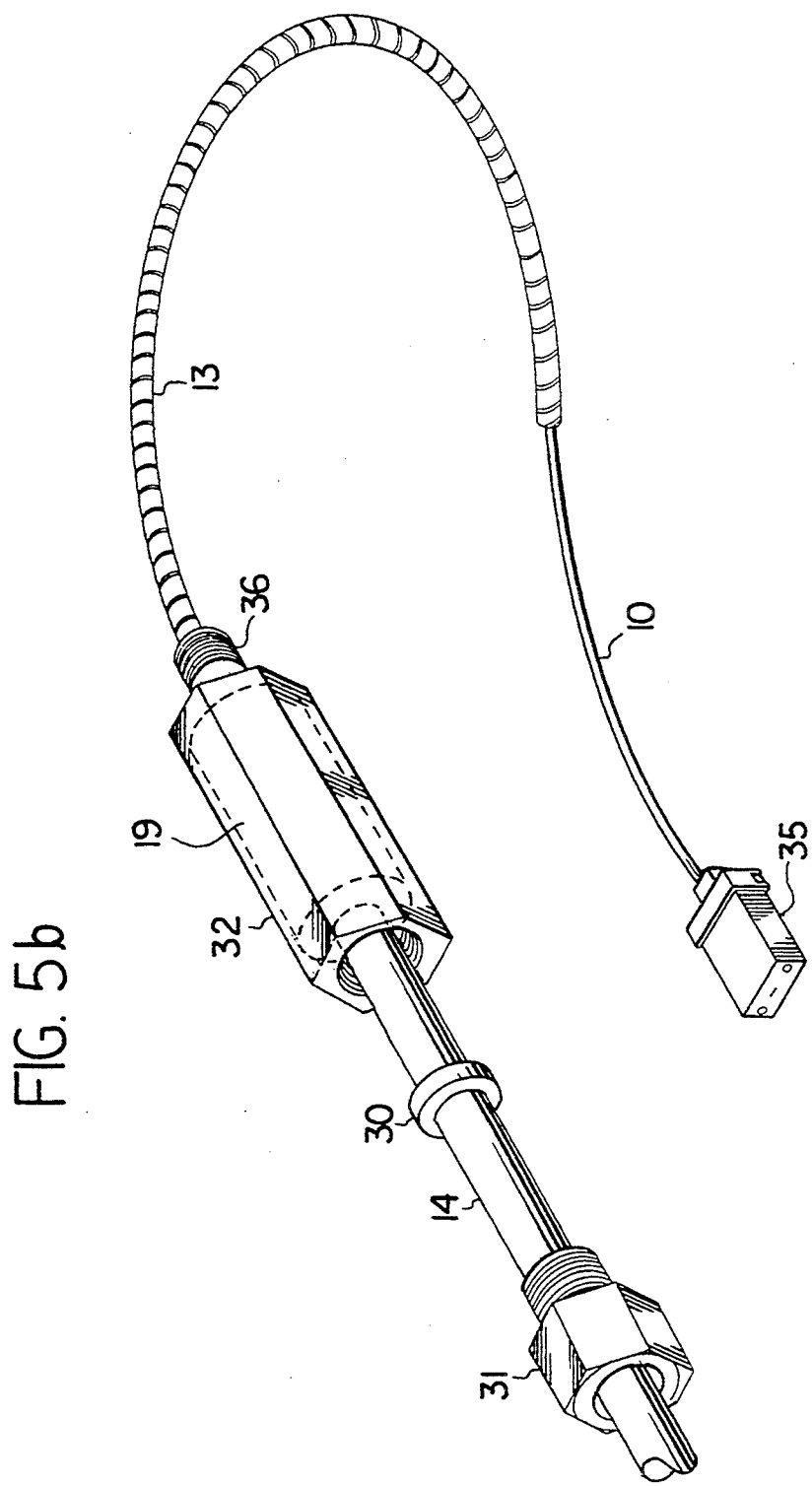
FIG. 5b is a perspective view of the assembly according to the embodiment including an optical ribbon.
Figure 6:
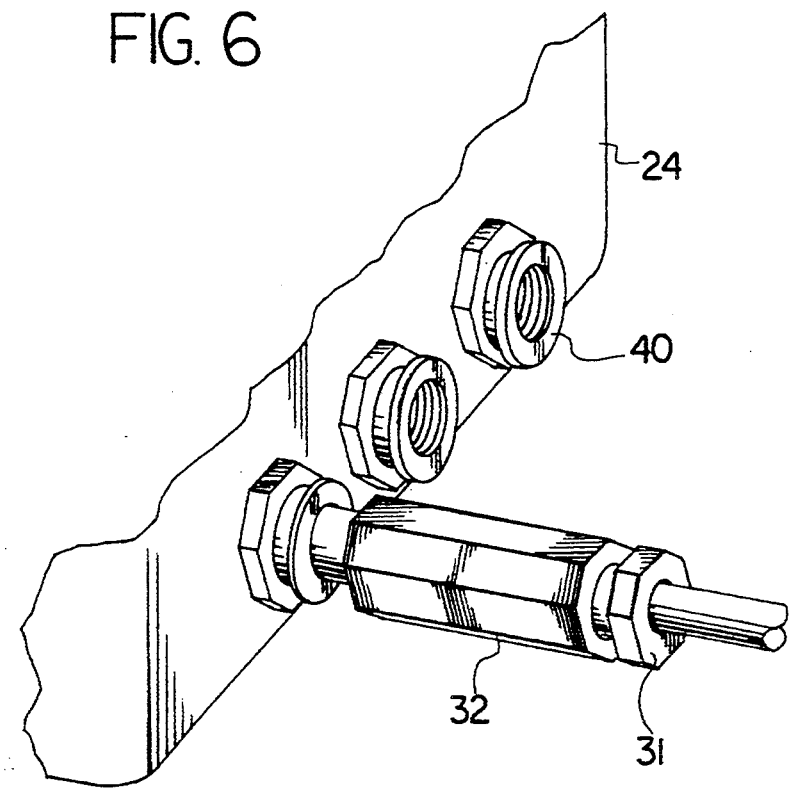
FIG. 6 is a perspective view of the assembly including an optical enclosure; and, FIG. 7 is a perspective view of a heat shrinkable tube applied over the assembly as attached to an optical enclosure.
Figure 7:
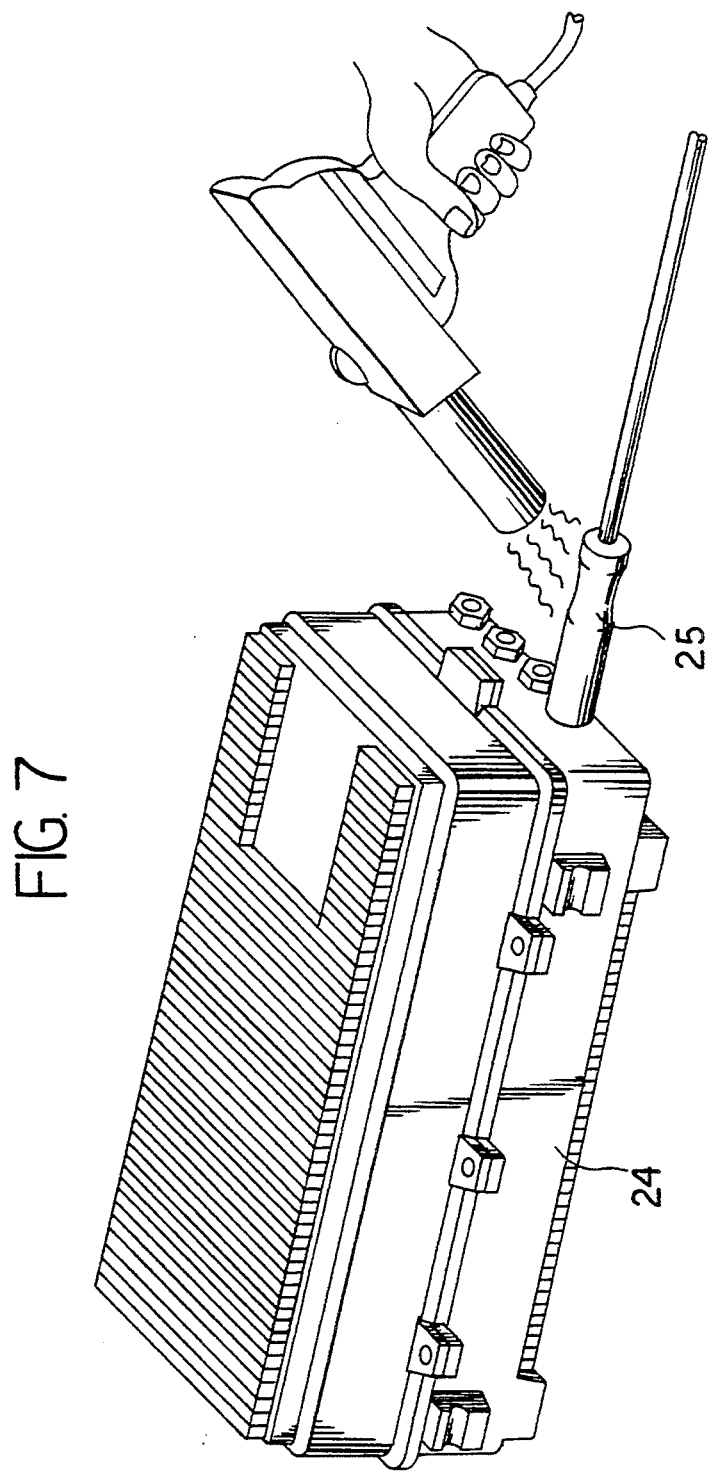

Alternate preferred embodiments are shown in FIGS. 5a and 5b. A section of heat shrinkable tubing 25 is not shown to the left of nut 31. Grommet 30 is located around sheath 14 between nut 31 and jacket 19 within rigid tube 32. Rigid tube 32 has on one end an externally threaded extension 36 for fitting to an enclosure. A single tube 10 containing an optical ribbon is attached to a ribbon connector 35 as shown in FIG. 5b, or tubes 10 each containing an optical fiber proceed to connectors 18. Spiral wrap 13 protects a tube 10 in either case.

Threaded end 36 is then inserted into an internally threaded optical entry port 40 of optical enclosure 24. Nut 31 is threaded into rigid tube 32, providing a compressive fit with grommet 30. For added environmental protection, heat shrinkable tubing 25 is then cured over rigid tube 32 and nut 31.

The invention can also be used in cable pulls as shown by the assembly in FIG. 8. Pulling eye 52 is mounted to a flexible, strong tubular hose 51 which may be a mesh of flexible metal wires or other material such as strong plastic. A nut 50, having the same connection geometry as port 40, is attached to hose 51. A protective member such as a split foam or plastic tube is placed over the optical elements extending from the member 32 into hose 51.

It will be appreciated that variations of the preferred embodiments may be used within the scope of the claims.

What is claimed is:

1. A cable assembly for use with optical enclosures, comprising:
    a plurality of optical fibers, each optical fiber including a proximal span in which the optical fiber is held within a sheathed cable, a distal end, and a mediate span therebetween:
    a plurality of flexible tubes, each said flexible tube surrounding a mediate span of one of the said optical fibers;
    a water-impervious plug encasing a portion of the mediate span of the plurality of optical fibers and the flexible tubes, the plug extending over a portion of the cable sheath; and,
    a rigid jacket encasing the plug.

2. A cable assembly as recited in claim 1 further comprising a cable strength member having a portion thereof extending into and embedded in the plug.

3. A cable assembly as recited in claim 1 further comprising an environmentally sealed housing over the rigid tube for attaching the cable to an optical equipment enclosure.

4. A cable assembly as recited in claim 3, wherein the housing comprises a single rigid tube and a single nut directly connectable to the rigid tube, the housing having no third nut.

5. A cable assembly, comprising:
    an optical enclosure having an internally threaded optical entry port;
    a single rigid tube having first and second ends, the first end having an externally threaded extension connected to the entry port such that the rigid tube is outside the enclosure, and means environmentally sealing such connection;
    a plurality of optical fibers each including a proximal span held in a sheathed cable, a distal end within the enclosure, and a mediate span therebetween;
    a plurality of flexible tubes, each said flexible tube surrounding a mediate span of one of the optical fibers; and,
    a water-impervious plug contained in the rigid tube, the plug encasing a portion of the mediate span of the plurality of the optical fibers and flexible tubes, the plug extending over a portion of the cable sheath.

6. A cable assembly as recited in claim 5, further comprising a rigid jacket encasing the plug.

7. A cable assembly as recited in claim 5, further comprising a cable strength member having a portion thereof extending into and embedded in the plug.

8. A cable assembly as recited in claim 5, further comprising a single environmentally sealed nut directly connectable to the second end of the rigid tube in the absence of a third nut.

9. A cable assembly for use with optical enclosures, comprising:
    an optical ribbon including a proximal span in which the optical fiber is held within a sheathed cable, a distal end, and a mediate span therebetween:
    a flexible tube surrounding the mediate span of the optical ribbon; and,
    a water-impervious plug encasing a portion of the mediate span of the optical ribbon and the flexible tube, the plug extending over a portion of the cable sheath.

10. A cable assembly as recited in claim 9, further comprising a rigid jacket encasing the plug.

11. A cable assembly as recited in claim 9, further comprising a cable strength member extending into and embedded in the plug.

12. A cable assembly as recited in claim 9, further comprising an environmentally sealed housing over the rigid tube for attaching the cable to an optical enclosure.

13. A cable assembly as recited in claim 12, wherein the housing comprises a single rigid tube and a Single nut directly connectable to the rigid tube, the housing having no third nut.

14. A cable assembly for cable pulls, comprising:
    an optical element including a proximal span in which the optical element is held within a sheathed cable, a distal end, and a mediate span therebetween:
    a flexible tube surrounding the mediate span of the optical element;
    a water-impervious plug encasing a portion of the mediate span of the optical element and the flexible tube, the plug extending over a portion of the cable sheath; and,
    a strong, flexible tubular hose holding the optical element distal end, the hose having two ends, one hose end mounted to a cable pulling eye and the other hose end mounted to a housing over the plug.

* * * * *